(12) United States Patent
Nozaki (10) Patent No.: US 8,724,048 B2
(45) Date of Patent: May 13, 2014

(54) DISPLAY DEVICE INCLUDING CONDUCTIVE ELEMENT FOR DISCHARGE OF STATIC CHARGES GENERATED IN A DISPLAY PANEL

(75) Inventor: Kenichi Nozaki, Saitama-ken (JP)

(73) Assignees: Kabushiki Kaisha Toshiba, Tokyo (JP); Japan Display Inc., Tokyo (JP)

( * ) Notice: Subject to any disclaimer, the term of this patent is extended or adjusted under 35 U.S.C. 154(b) by 1176 days.

(21) Appl. No.: 12/645,260

(22) Filed: Dec. 22, 2009

(65) Prior Publication Data
US 2010/0156857 A1 Jun. 24, 2010

(30) Foreign Application Priority Data

Dec. 19, 2008 (JP) ................. P2008-324658

(51) Int. Cl.
*G02F 1/1333* (2006.01)
*G02F 1/1345* (2006.01)

(52) U.S. Cl.
USPC ............................................. 349/59; 349/150

(58) Field of Classification Search
USPC ................. 349/40, 58–59, 149–150
See application file for complete search history.

(56) References Cited

U.S. PATENT DOCUMENTS

| 7,298,437 | B2* | 11/2007 | Edwards et al. | 349/111 |
| 7,492,422 | B2* | 2/2009 | Ja et al. | 349/58 |
| 2008/0030666 | A1* | 2/2008 | Abe et al. | 349/150 |
| 2009/0015777 | A1* | 1/2009 | Nakanishi | 349/150 |
| 2009/0122250 | A1* | 5/2009 | Oohira | 349/149 |

FOREIGN PATENT DOCUMENTS

| JP | 2004-29448 | | 1/2004 |
| JP | 2004029448 | A * | 1/2004 |
| JP | 2006-236870 | | 9/2006 |

* cited by examiner

*Primary Examiner* — Nathanael R Briggs
(74) *Attorney, Agent, or Firm* — Oblon, Spivak, McClelland, Maier & Neustadt, L.L.P.

(57) ABSTRACT

A display device includes a display cell including a display region and a frame region surrounding the display region. A driver circuit is connected to the display cell to drive the display cell and is controlled by a circuit board arranged along in a longitudinal direction of the display cell. An insulating protection sheet covers the driver circuit and the circuit board, and one end of the insulating protection sheet is fixed to the frame region of the display cell. A conductive tape is formed on the insulating protection sheet between the display region and the driver circuit along one side of the display cell, such that static charges generated in the display region are discharged to ground through the conductive tape.

14 Claims, 6 Drawing Sheets

DISPLAY DEVICE INCLUDING CONDUCTIVE ELEMENT FOR DISCHARGE OF STATIC CHARGES GENERATED IN A DISPLAY PANEL

CROSS-REFERENCE TO RELATED APPLICATION

This application is based upon and claims the benefit of priority from prior Japanese Patent Applications No. 2008-324658 filed Dec. 19, 2008, the entire contents of which are incorporated herein by reference.

BACKGROUND OF THE INVENTION

1. Field of the Invention

The present invention relates to a display device, especially a display panel having a conductive layer provided adjacent the display panel to discharge static charges generated in the display panel to ground through the conductive layer.

2. Description of the Background Art

Conventionally, electronic components such as driver circuits, printed circuit boards or connectors are covered with and held by a metal vessel. Further, since electrostatic charges generated in a display panel are discharged to ground through the metal vessel, the vessel also functions to protect the driver circuits or other circuit components from the electrostatic charges.

Recently, to produce a light and compact display panel, it has been proposed to eliminate the vessel and arrange the driver circuits or the circuit boards along a longitudinal direction of the display panel and cover the circuit components or the circuit boards with a protection sheet. The protection sheet is fixed to the display panel by a fixing tape in place of the vessel. Since, the protection sheet and the fixing tape are made of insulating material, the static charges generated in the display panel are easily discharged to the circuit components or the circuit boards, which finally results in destruction of the circuit components or the circuit boards.

Then, a new display device has been proposed as shown in Japanese patent application No. 2006-236870. In this patent application, the driver circuits are connected to a ground terminal (GND) by a conductive tape. Therefore, it is possible to discharge the static charges generated in the display panel to the ground terminal through the conductive tape prior to flow to the driver circuits. However, since the conductive tape contacts with the driver circuit, the static charges may flow to the driver circuits, which results in malfunction or damage to the driver circuits.

BRIEF SUMMARY OF THE INVENTION

The present invention has been made to address the above mentioned problems, and provide a display device in which malfunction or damage to the driver circuits or the circuit board caused by the static charges is prevented.

Thus, according to one aspect of the invention, there is provided a display device including display cell including a display region and a frame region surrounding the display region; a driver circuit connected to the display region to drive the display region; a circuit board arranged along a side of the display cell and including a control circuit to control the driver circuit; an insulating protection sheet covering the driver circuit and the circuit board and having one end connected to the frame region of the display cell; and conductive tape formed on the insulating protection sheet between the display region and the driver circuit along one side of the display cell, and wherein static charges generated in the display region are discharged to ground through the conductive tape.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF PREFERRED EMBODIMENTS

A display device according to an exemplary embodiment of the present invention, in particular, a liquid crystal display device having a discharge element to protect electronic components provided at a peripheral portion of the display device, will now be described with reference to the accompanying drawings wherein the same or like reference numerals designate the same or corresponding parts throughout the several views.

First Embodiment

Figure 1:
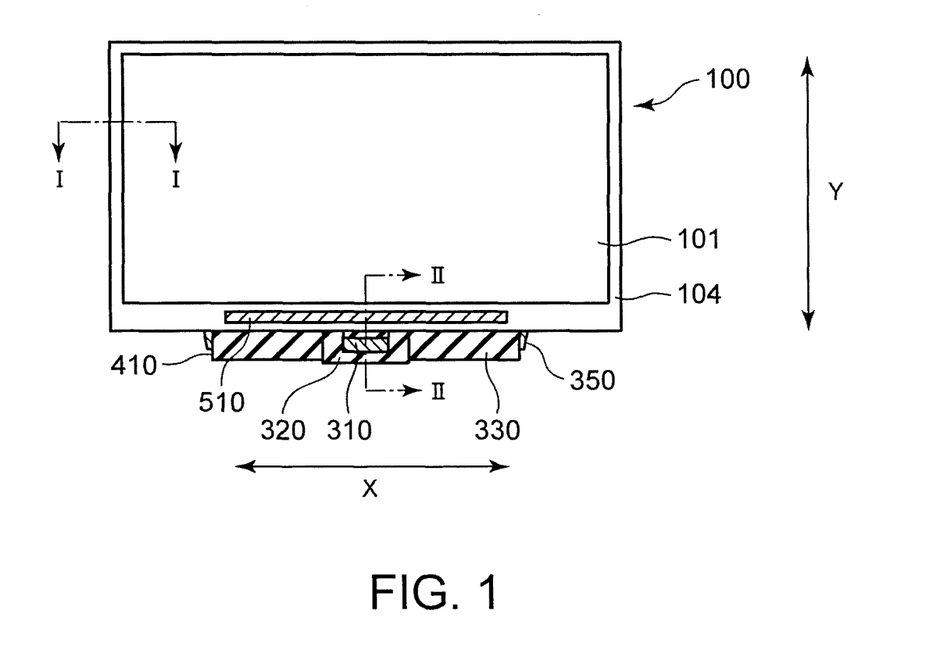
FIG. 1 is a schematic plan view showing a display device according to a first embodiment of the invention.
Figure 2:
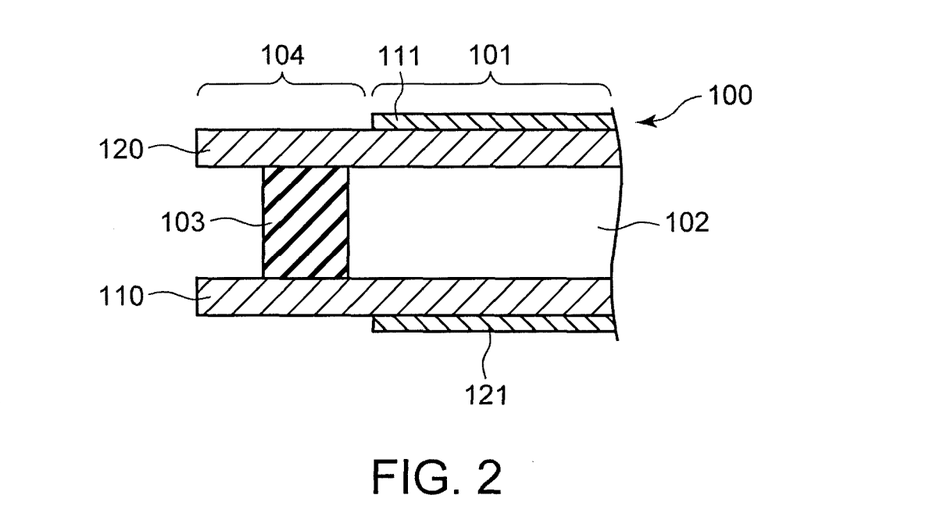
FIG. 2 is a cross-sectional view showing the display device shown in FIG. 1 taken a line I-I according to the first embodiment of the invention.

FIGS. 1 and 2 are a schematic plan view and a cross-sectional view of a display device, particularly, a liquid crystal display device as one example of the display device according to a first embodiment. In FIGS. 1 and 2, a liquid crystal display cell 100 is shown as a display panel, however, this invention is applicable to other display panels such as a plasma display panel, an organic display panel (EL) or a field emission display (FED).

The substantially rectangular liquid crystal display cell 100 includes an array substrate 110, a counter substrate 120 opposite to the array substrate 110 and a liquid crystal layer 102 interposed therebetween. The array substrate 110 and the counter substrate 120 are sealed by a seal element 103 so as to maintain a gap in which the liquid crystal layer 102 is held. The display cell 100 includes a rectangular active display area 101 to display images surrounded by the seal element 103. The display area 101 is formed of a plurality of pixels arranged in a matrix including switching transistors and pixel electrodes formed on the array substrate. The counter substrate 120 is provided with a common electrode facing the switching transistors.

The display cell 100 also includes a frame region 104 surrounding the display area 101. Retardation films 111 and 121 are provided at outer surfaces, i.e., opposite surfaces of the array substrate 110 and the counter substrate 120, respectively, which do not contact with the liquid crystal layer 102. The retardation films 111 and 121 are formed facing the display area 102.

When the switching transistors are formed of poly-silicon (P-Si), a scan line driver is also integrally formed in a frame portion 104 on the array substrate to drive a display panel 101. On the other hand, a signal line driver is formed of an IC implemented outside the array substrate, as explained later. Accordingly, it becomes possible to arrange ICs such as outside drivers at only one edge 104 of the frame portion of the display area 101, which is amenable to a narrow frame. Of course, it is possible to arrange the scan line driver formed of an IC in the frame portion located at a narrow side of the display panel as the signal line driver, although the arrangement may not achieve a narrow frame.

Figure 3:
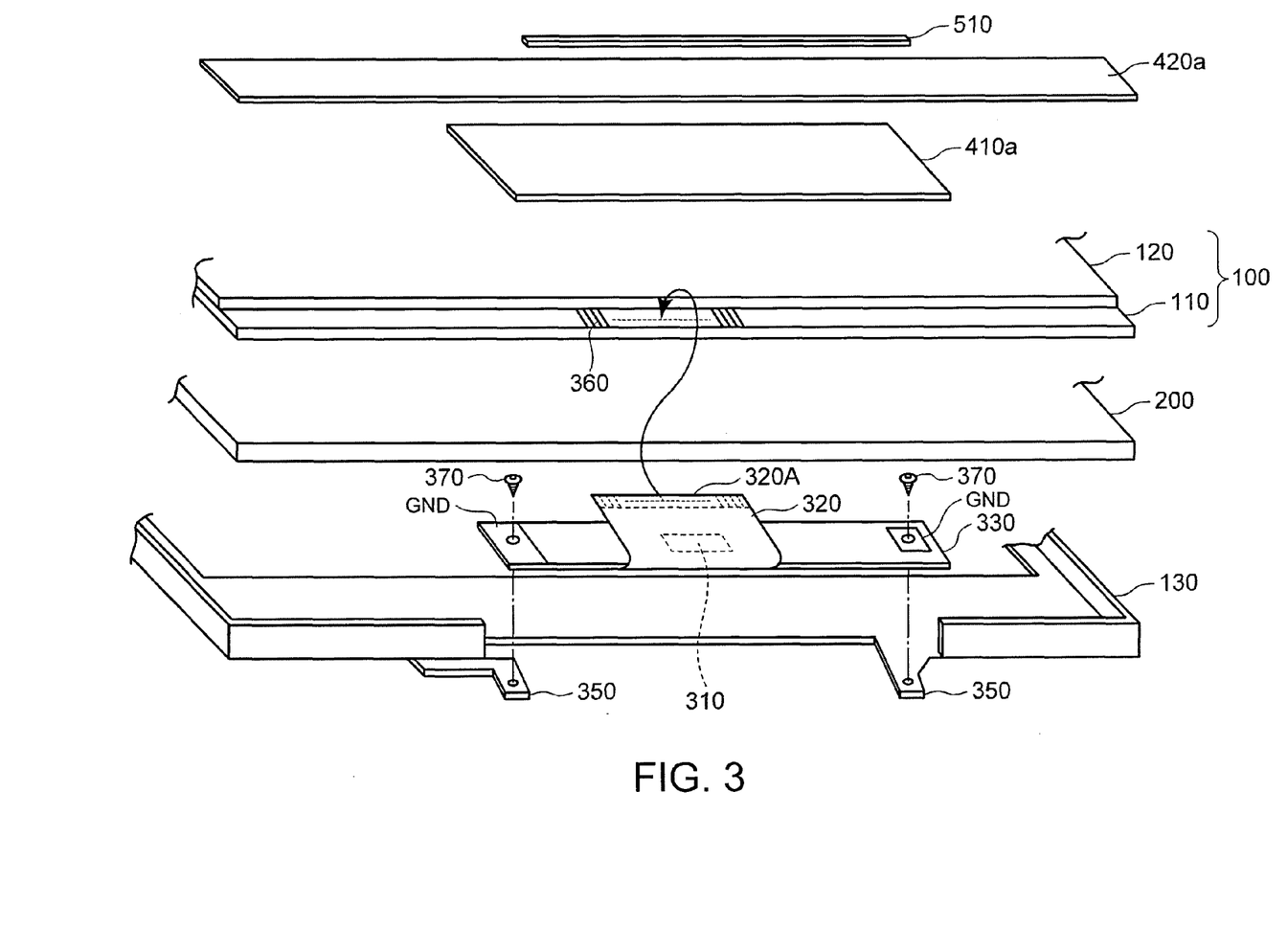
FIG. 3 is a fragmentary broken and perspective view showing the display device shown in FIG. 1 according to the first embodiment of the invention.
Figure 4:
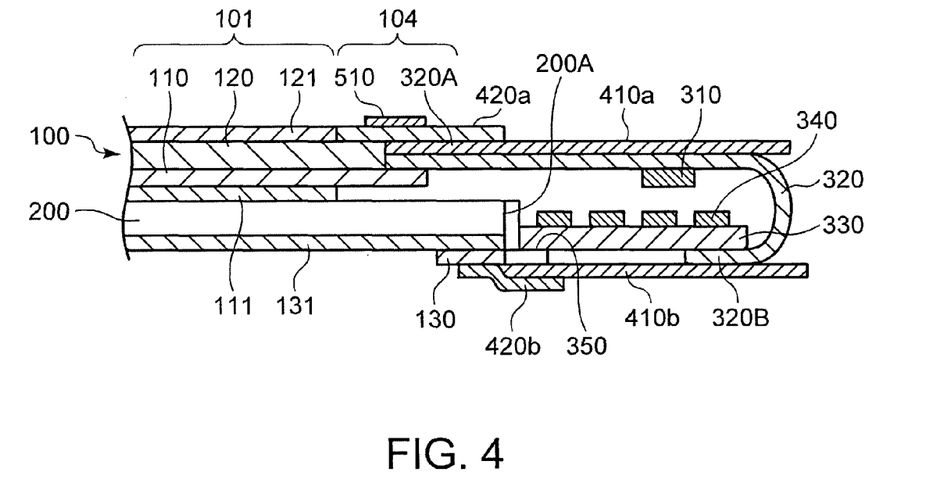
FIG. 4 is a cross-sectional view showing the display device shown in FIG. 1 taken a line II-II according to the first embodiment of the invention.

FIG. 3 is a fragmentary broken and perspective view showing the display device shown in FIG. 1 according to the first embodiment of the invention. FIG. 4 is a cross-sectional view showing the display device shown in FIG. 1 taken a line II-II according to the first embodiment of the invention. As shown in FIGS. 3 and 4, a back light unit 200 is arranged at a rear side of the display cell 100, i.e., an outer side of the array substrate 110. The substantially rectangular printed circuit board 330 provided with some electronic components 340 such as resistors or condensers is arranged along a side 200A of the back light unit 200 in parallel with a long side edge of the display cell and connected to the array substrate 110 through a flexible printed circuit board 320. A driver circuit 310 is mounted on the flexible printed circuit board 320 and controls the display cell 100 with the electronic components 340 on the circuit board 330. Both of main surfaces of the circuit board 330 and the flexible printed circuit board 320 are covered with protection sheets 410a and 410b.

The back light unit 200 provided at an outer surface of the array substrate 110 has a rectangular flat shape and faces the array substrate 110 having a larger area than the display area 101. In this embodiment, Light Emitting Diode (LED) is used as a light source of the back light unit 200.

The display cell 100 is held by a plastic flat plate 131 arranged at a rear side of the back light unit 200 opposing to the array substrate 110 and a metal frame 130 surrounding an outer peripheral of the plastic flat plate 131, in which a cross section of the metal frame 130 is L shaped. The display cell 100 is attached to the back light unit 200 by a double stick tape, and further attached to the plastic frame 131 or the metal frame 130 by the double stick tape. The plastic plate 131 is fixed to the metal frame 130. The metal frame 130 and the protection plate are fixed by an insulating fixing tape 420b. One edge 320A of the flexible printed circuit board 320 is fixed to the array substrate 110 at the bumps connected with various driving lines in the frame region 104 of the display cell 100 by an anisotropically conductive adhesion bond. In this embodiment, the COF method (Chip On Film) is used, in which the driver circuit 310 is mounted on a rear surface of the flexible printed circuit board 320 so as to face the circuit board 330. The other end 320B of the flexible printed circuit board 320 is connected to the circuit board 330 by being curled from the array substrate 110 to the rear side of the circuit board 330 so as contain the circuit board 330. The circuit board 330 is arranged along the side 200A of the back light unit 200.

The circuit board 330 is a belt-like shape having a long side and a short side. The circuit board 330 is arranged so that the long side of the circuit board 330 is arranged along the long side 200A of the back light unit 200. If a direction in parallel with the long side of the circuit board 330 is X, and a direction perpendicular to the direction X is Y, the length of the long side of the circuit board 330 in the X direction is smaller than that of the display cell 100. The shape and dimension of the circuit board 330 are variable corresponding to the display cell 100.

In this embodiment, the length of the short side of the circuit board 330 in the vertical direction Y is 8 mm, the length in the lateral direction X is 20 cm and the length in the lateral direction X of the display cell 100 is 25 cm as one example. The driver circuit 310 is formed in a belt-like shape so that the length of the driver circuit 310 in the vertical direction Y is 3 mm and the length of the side in the lateral direction X is 10 mm. The lateral length of the flexible printed circuit board 320 in the X direction is 48 mm. In this embodiment, single driver circuit 310 is mounted in a center of the flexible printed circuit board 320, however, a plurality of driver circuits may be mounted on the flexible printed circuit board 320, if necessary. In a case, a plurality of driver circuits 310 are arranged, respective driver circuits 310 are mounted on corresponding flexible printed circuit boards 320 arranged along a lateral direction X of the circuit board 330. In this embodiment, a driver circuit 310 is arranged in the center of the flexible printed circuit board 320.

The dimension of each element that constructs the display device is shown only to easily show a correlation between the elements as examples in each figures.

The circuit board 330 is fixed to the metal frame 130 by metal fixing elements 350 provided at edge portions of the metal frame 130 in the X direction using screws 370. In this embodiment, conductive material such as aluminum is used as the metal frame 130, however, other conductive metal materials such as copper may also be used. The metal fixing elements 350 are electrically connected to ground terminals GND provided at end portions of the circuit board 330 by screws 370. In this embodiment, the fixing elements 350 are integrally formed with the metal frame 130. Accordingly, the metal frame 130 provided outside of the back light unit 200 is also connected to the ground terminal GND of the circuit board 330 through the metal fixing elements 350 and the screws 370.

The driver circuit 310, the flexible printed circuit board 320, the circuit board 330 and the electronic components 340 are covered with rectangular protection sheets 410a and 410b provided so as to cover the both main surfaces of the circuit board 330 containing the flexible printed circuit board 320 on which the driver circuit 310 is mounted. The protection sheets 410a and 410b are insulative and are made from PET (polyethylene terephthalate) with thickness of 40-50 μm. The size of the protection sheets 410a and 410b may be enough if they can cover the circuit board 330. In this embodiment, the length in the direction Y of the protection sheets 410a and 410b is 8 mm and the length of the lateral direction X is 20 cm. The protection sheet 410a arranged upper side where the driver circuit is located is designed so that its size is larger than that of the lower side protection sheet 410b because one edge of the flexible printed circuit board 320 is connected to the bumps 360 of the array substrate 11 and covered with the lower side protection sheet 410b.

The protection sheets 410a and 410b are arranged so that a portion of the protection sheet located on the fixing elements 350 is exposed to connect the fixing elements 350 to the ground terminals GND of the circuit board 330 by the screws 370.

One edge of the protection film 410a extending in the lateral direction X, which covers the upper surface of the circuit board 330, is arranged so as to contact with the frame region 104 of the display cell 100, i.e., the peripheral portion of the counter substrate 120.

Further, the protection sheet 410a covers one end of the flexible printed circuit board and is attached to the counter substrate 120 at the frame region 104 by an insulating fixing tape 420a arranged adjacent a polarizer 121. On the other hand, one edge of the protection layer 410b that covers the lower surface of the circuit board 330 is arranged along the lateral direction X so as to contact with peripheral portions of the plate 131 or the metal frame 130, and is attached to the metal frame 130 along a side of the rear surface of the back light unit 200 in the lateral direction X by an insulating fixing tape 420b.

The length of the fixing tape 420a along the side of the counter substrate 120 to attach the protection sheet 410a to the counter substrate 120 is designed at 20 cm in the lateral direction X, fitted to the length of the protection sheet 410a, and the length of the vertical direction Y is designed at 5 mm so as to straddle the counter substrate 120 and the protection sheet 410a. The length of the insulating fixing tape 420b to attach the protection sheet 410b to the back light unit 200 is designed so that the length in the lateral and vertical directions are the same as those of the fixing tape 420a, respectively. The length of the insulating fixing tape 420b is designed so that the fixing tape 420b does not cover the metal fixing element 350 entirely, but to expose it partially. Since the protection sheets 410a and 410b are lighter than a metal vessel, this construction contributes to lightness and compactness of the display device.

In this embodiment, a conductive layer 510 made of aluminum is attached to the belt-like insulating fixing tape 420a which fixes the protection layer 410a to the display cell 100, along a longitudinal direction of the protection sheet 410a by a double face adhesive tape. Other conductive material such as copper may be used as the conductive layer 510. The width of the conductive layer 510 in the Y direction is 1 mm, and the length of the conductive layer 510 in the lateral direction X is designed so that the edge of the conductive layer 510 is apart from the metal fixing elements 350 within 3 mm. That is, an edge of the conductive layer 510 facing the display cell 100 is located on the frame portion 104 and an other edge facing the driver circuit is located between the display cell 100 and the driver circuit 100. Further, a shortest distance between the conductive layer 510 and the metal frame 130 is shorter than that of between the conductive layer 510 and the driver circuit 310, in which the distance is set so that charges generated in the display cell are discharged to the fixing elements 350 through the conductive layer 510. In this embodiment, the distance is 3 mm, however, it may be apparent to set a shorter distance than 3 mm. Further, the fixing elements 350 are partially exposed, however, even if the protection sheets 410 entirely cover the fixing elements 350, it is possible to discharge the static charges by dimensioning the shortest distance between the fixing elements and the conductive layer 510 to be smaller than that between the conductive layer 510 and the driver circuit 310.

When the conductive layer 510 is formed on the fixing tape 420a, the conductive layer 510 may be arranged closer to the display area 101 or closer to the protection sheet 410a. However, when the display cell 100 is housed in a shield case, the location of the conductive layer 510 is determined so that the conductive layer 510 is not looked at even if the display cell 100 is peeped from a tiny space at the frame region 104, in which the conductive layer 510 is arranged too close to the display area 100.

According to this embodiment, static charges generated in the display cell 100 are discharged through the conductive layer 510 with low resistance to the fixing element 350 provided at the metal frame 130 which is connected to the ground terminals GND of the circuit board 330. The static charges tend to flow with low resistance to the conductive layer 510 which is arranged closer to the charge generating place. Accordingly, the charges generated in the display area 101 flow to the conductive layer 510 by an air charge, which is arranged closer to the display area 101 than the driver circuit 310 or circuit board 330 covered with the insulating fixing tape 420a. The static charges do not flow to the driver 310 circuit or the circuit board 330 because the charges flow to the ground terminals GND through the conductive layer 510 and the fixing elements 350 provided at the frame 130. Therefore, it becomes possible to prevent malfunction circuit or damage to the driver circuit 310 or the circuit board 330 caused by the electrostatic charges generated in the display area 101.

Here, even if air penetrates the space between the fixing tape 420a and the protection sheet 410a, i.e., a floating condition is generated, the static charges flow to the conductive layer 510 located closer to the charge generating place and to the fixing elements 350 by air discharge, without flowing to the driver circuit 310 or the circuit board 330. According to this embodiment, it is not required to directly connect the conductive layer 510 to the fixing elements 350 if the conductive layer 510 is arranged so as to be close to the fixing element 350. Therefore, the manufacturing process is simplified compared with connecting the conductive layer 510 to the fixing elements 350 directly. Further, it is possible to form the conductive layer 510 in a simple belt-like shape, which results in a cost saving.

In this embodiment, the discharge is made between the edge portion of the conductive layer 510 and the fixing elements 350. However, it is also possible to make the discharge by making the conductive layer 510 long so as to extend beyond the location of the fixing elements in the X direction. That is, it is necessary to set the shortest distance between the fixing elements 350 and the conductive layer to be smaller than the shortest distance between the display cell 101 and the driver circuit 310.

Second Embodiment

Figure 5:
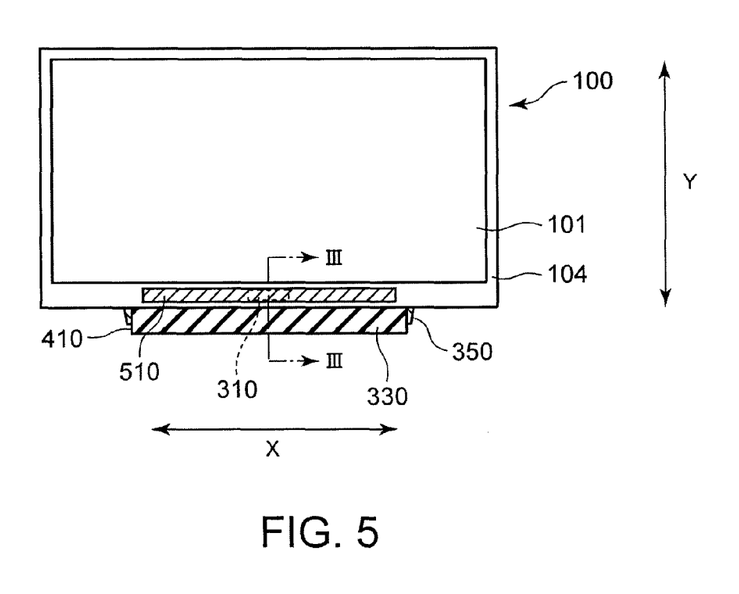
FIG. 5 is a schematic plan view showing a display device according to a second embodiment of the invention.
Figure 6:
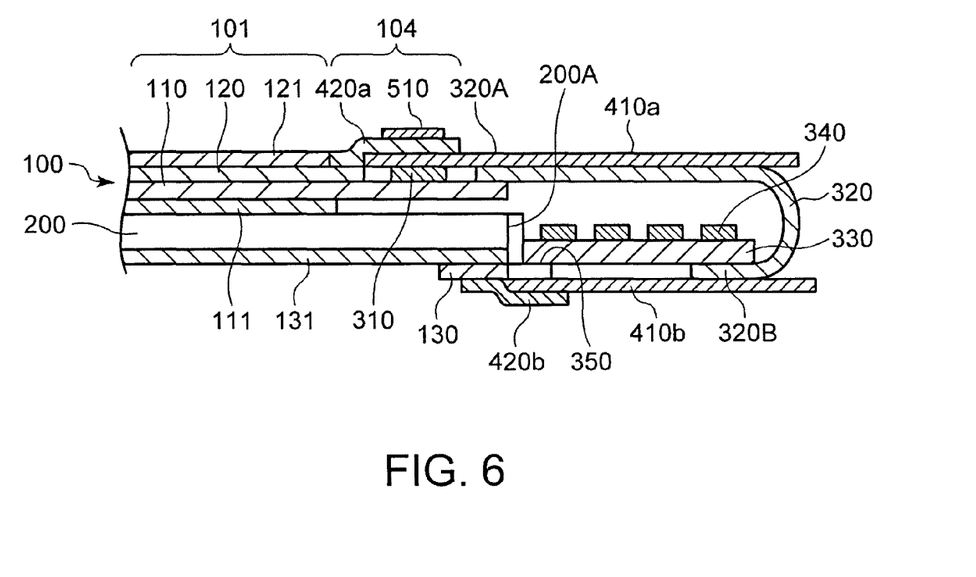
FIG. 6 is a cross-sectional view showing the display device shown in FIG. 5 taken a line III-III according to the second embodiment of the invention.

FIG. 5 is a plan view showing a second embodiment according to the present invention and FIG. 6 is a cross-sectional view taken along the line III-III. Since the constructions of the display cell 100 and the back light unit 200 are the same as those in the first embodiment, the corresponding explanation will be abbreviated.

In this second embodiment, the COG (Chip On Glass) method is adopted. in which the driver is formed on the array substrate. The length of the side of the array substrate 110 in the lateral direction X is the same as that of the counter substrate 120 in the display cell 100. However, the array substrate 110 extends in the vertical direction Y beyond an edge of the counter substrate 120 so as to have an extended area. The driver circuit 310 is arranged on the extended area of the array substrate 110 and is directly connected with bumps formed on the extend area and connected with various driving lines in the display area 101. The driver circuit 310 is formed in a rectangular solid and is arranged along the longer side of the array substrate 110 in the lateral direction X. The driver circuit 310 is connected with the circuit board 330, where electronic components are mounted, by a flexible printed circuit board 320.

Since, the rectangular protection sheet 410a is required to cover not only the circuit board 330 but the driver circuit 310 arranged outside of the circuit board 330, the protection sheet 410a is extended to the surface of the driver circuit 310 and the end contacts with a side of the counter substrate 120. The protection tape 410a is fixed to the counter substrate 120 by a fixing tape 420a in the frame portion 104. The conductive layer 510 is formed on the insulating fixing tape 420a as the first embodiment, along a side of the protection sheet 410a, that is, a long side of the display cell 100. In this embodiment, the conductive layer 510 is made so as to have a width of 4 mm in the direction Y and to cover the fixing tape 420a. The length of the conductive layer 510 in the lateral direction X is set so that the ends of the conductive layer 510 are apart from the metal fixing element 350 in the metal frame 350 within 3 mm. Further, the width of the conductive layer 510 in the vertical direction Y is designed larger than that of the first embodiment, that is, from 1 mm to 4 mm. Accordingly, it becomes possible to arrange the conductive layer 510 so that the distance between the conductive layer 510 and the display area 101 is smaller than that between the display area 101 and the driver circuit 310 in the COG method. Further, the conductive layer 510 can be arranged within 3 mm from the fixing elements 350 of the frame 130 with larger width. Accordingly, the charges generated in the display cell 100 can be flown to the fixing elements 350 through the conductive layer 510, not to the driver 310 by arranging the conductive layer 510 closer to the display area 101 than the driver circuit 310.

In this embodiment, since the driver circuit 310 is arranged on the frame region 104 in the display cell 100, the charges generated in the display cell 100 may be directly discharged to the driver circuit 310, not to the conductive layer 510 if air penetrates a space between the insulating fixing tape 420a and the protection sheet 410a, or between the insulating fixing tape 420a and the display cell 100. Accordingly, it is necessary to construct the display cell so that air does not penetrate between the insulating fixing tape 420a and the protection sheet 410a, or between the insulating fixing tape 420a and the substrate.

However, since the display area 101 is arranged close to the conductive layer 510 by making the width of the conductive layer 510 large in the Y direction, it becomes possible to make the charges generated in the display area 101 caused by an adhesion failure uniquely flow to adjacent conductive layer 510 and to the fixing elements 350 by air discharge even if air penetrates between the fixing tape 420a and the protection sheet 410a.

In the display device according to this embodiment which uses the COG method, it becomes possible to make the charges generated in the display cell 100 flow to the fixing element 350 provided at the frame 130, and not to the driver circuit 310, by setting the distance between the display area 101 and the conductive layer 510 smaller than that between the display area 101 and the driver circuit 310.

Accordingly, the second embodiment also can prevent the malfunction and damage to the driver circuit 310 or the circuit board 330 caused by the static charges generated in the display cell 100. In FIG. 5, the location of the driver circuit 310 is shown by dotted line, which means the driver circuit 310 is hidden by the conductive layer 510 and the insulating fixing tape 420a.

Third Embodiment

Figure 7:
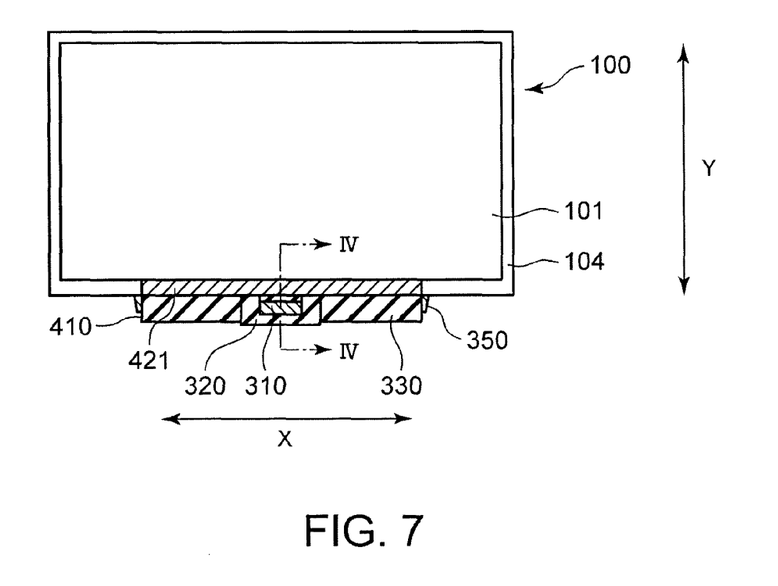
FIG. 7 is a schematic plan view showing a display device according to a third embodiment of the invention.
Figure 8:
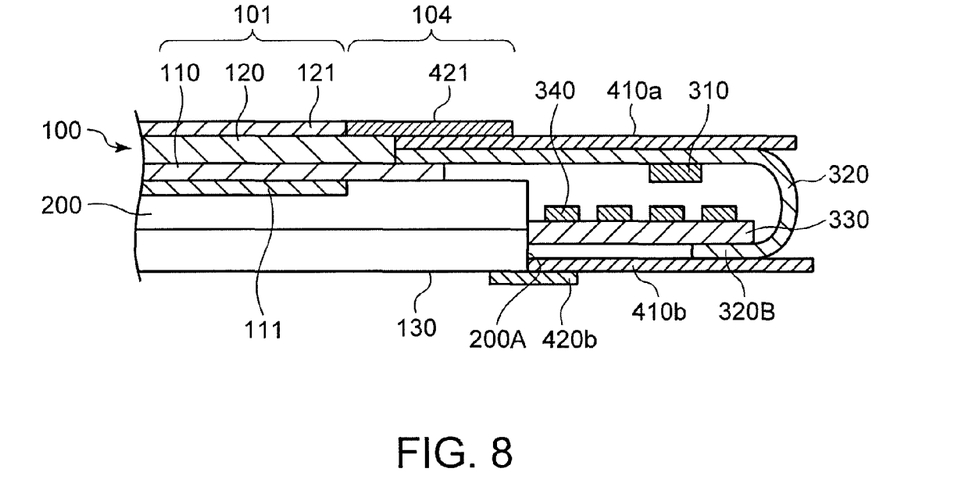
FIG. 8 is a cross-sectional view showing the display device shown in FIG. 7 taken a line N-IV according to the third embodiment of the invention.

FIG. 7 is a schematic plan view showing a display device according to a third embodiment of the invention. FIG. 8 is a cross-sectional view showing the display device shown in FIG. 7 taken along the line IV-IV.

In this embodiment, a conductive fixing tape 421, not an insulating tape is used to attach one edge of the rectangular protection sheet 410a to the frame region 104 of the display cell 100. The conductive fixing tape 421 is formed of aluminum in this embodiment, however, other conductive material such as copper may be used. On the other hand, an insulating fixing tape 420b is used to fix the protection sheet 410b to the rear surface of the back light unit 200 in order to reduce material cost, though a conductive fixing tape can be used. In this embodiment, the width of the conductive fixing tape 421 in the Y direction is 5 mm, and the length of the side in the X direction where the protection sheets 410a is fixed to the display cell by the fixing tape 421 is 20 cm. Since, the fixing elements 350 are provided in the frame 130 under the circuit board 330, the conductive fixing tape 421 is arranged adjacent the fixing elements 350 without directly being connected to the fixing elements 350. The fixing elements 350 are electrically connected to the ground terminal (GND) provided at the both ends of the circuit board 330 by screws 370.

According to the display device in this embodiment, when static charges are generated in the display area 101, the charges flow to the conductive fixing tape 421 and are discharged to the ground terminal (GND) of the circuit board 330 through the fixing elements 350. Since the distance from the noise generating portion to the driver circuit 310 or the circuit board 330 is set larger than that to the conductive fixing tape 421, the charges flow to the conductive fixing tape 421. Therefore, the destruction of the driver 310 or the circuit board 330 can be prevented as in the first embodiment.

Fourth Embodiment

Figure 9:
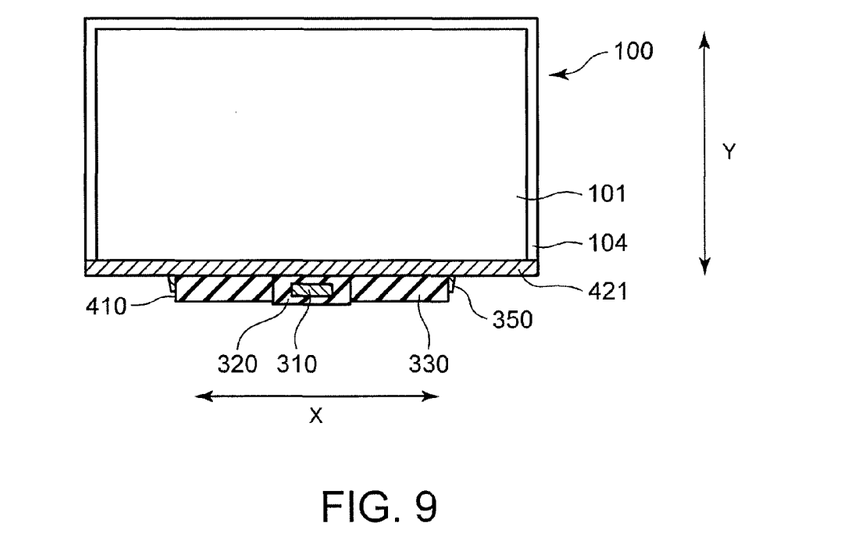
FIGS. 9 and 10 are schematic plan views showing front and rear surfaces of a display device according to a fourth embodiment of the invention.
Figure 10:
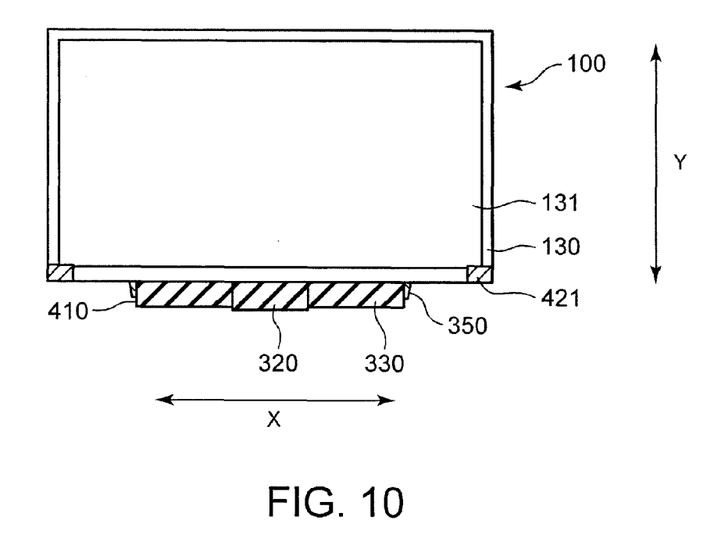
Figure 11:
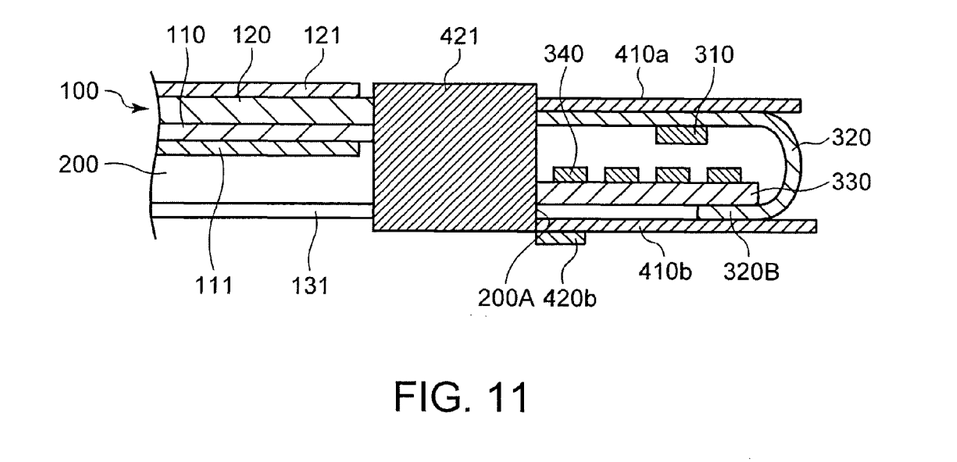
FIG. 11 is a fragmentary broken and perspective side view showing the display device shown in FIG. 9 according to the fourth embodiment of the invention.

FIGS. 9 and 10 are schematic plan views showing a display device according to a fourth embodiment of the invention. FIG. 11 is a cross-sectional view showing the display device shown in FIG. 9 taken along the line V-V.

In this embodiment, a conductive fixing tape 421 is used to attach one end of the protection sheet 410a to the frame region 104 of the display cell 100, as in the third embodiment. On the other hand, an insulating fixing tape 420 is also used to attach the protection sheet 410b to the rear side of the back light unit 200, as in the third embodiment. The conductive fixing tape 421 is formed so that the conductive fixing tape 421 is longer than the longitudinal side of the display cell 100, unlike in the third embodiment, with the conductive fixing tape 421 being folded to both rear sides of the display cell 100. The folded conductive fixing tape 421 is electrically connected to both edge portions of the metal frame 130 at the rear side of the display cell 100. In this embodiment, the charges generated in the display area 101 flow to the conductive fixing tape 421 that is located closer to the charge generating place and are discharged to the metal frame 130 that is directly connected to the ground terminal (GND) of the circuit board 330. According to this embodiment, the same effect as the other embodiments can be also achieved. Further, the discharge is made more reliably compared with other embodiments in which the charges are discharged to the fixing elements provided at the frame 130 arranged apart from the conductive fixing tape. Moreover, the manufacturing process to form such conductive fixing tape 421 is simple.

The present invention is useful for the display device in which a metal frame is used in place of the vessel to hold the display cell to achieve lightness and compactness. According to the present invention, the charges generated in the display cell are reliably discharged to the ground terminal of the circuit board without increasing weight and size.

In the embodiments, a liquid crystal display device is shown as a display panel, however, this invention is applicable to other display panels such as a plasma display panel, an organic display panel (EL) and a field emission display (FED).

The present invention is not limited directly to the above described embodiments. In practice, the structural elements can be modified without departing from the spirit of the invention. Various inventions can be made by properly combining the structural elements disclosed in the embodiments. For example, some structural elements may be omitted from all the structural elements disclosed in the embodiments. Furthermore, structural elements in different embodiments may properly be combined. It is to therefore be understand that within the scope of the appended claims, the present invention may be practiced other than as specifically disclosed herein.

What is claimed is:

1. A display device, comprising:
    a display cell including a display region and a frame region surrounding the display region;
    a metal frame including a fixing element to hold the display cell;
    a circuit board fixed to a fixing element and arranged along a longitudinal side of the display cell;
    a driver circuit connected to the display cell to drive the display cell;
    electronic components provided at the circuit board to control the driver circuit;
    an insulating protection sheet to cover the driver circuit and the circuit board;
    an insulating fixing tape to fix one end of the insulating protection sheet to the frame region of the display cell, the insulating fixing tape extending in a longitudinal direction of the display cell; and
    a conductive layer formed on the insulating fixing tape and extending in the longitudinal direction of the display cell, and
    said conductive layer having an edge adjacent the fixing element such that static charges generated in the display cell are discharged through the conductive layer to the fixing element of the metal frame.

2. The display device according to claim 1, wherein the display device further comprises:
    a back light unit held by the metal frame, said circuit board arranged along a longitudinal side of the back light unit.

3. The display device according to claim 1, wherein bumps connected to the driver circuit are formed only in one side of the display cell.

4. The display device according to claim 1, wherein the driver circuit is formed in the frame region of the display cell.

5. A display device, comprising:
    a substantially rectangular display cell including a display region and a frame region surrounding the display region;
    a metal frame to hold the display cell including a fixing element;
    a circuit board fixed to a fixing element and arranged along a longitudinal side of the display cell;
    a driver circuit connected to the display cell to drive the display cell;
    electronic components provided at the circuit board to control the driver circuit;
    an insulating protection sheet to cover the driver circuit and the circuit board; and
    a conductive fixing tape to fix one end of the insulating protection sheet to the frame region of the display cell, the conductive fixing tape extending in a longitudinal direction of the display cell and arranged adjacent the fixing element of the metal frame so that static charges generated in the display cell are discharged to the fixing element through the conductive fixing tape.

6. The display device according to claim 5, wherein the display device further comprises:
    a back light unit held by the metal frame, said circuit board arranged along a longitudinal side of the back light unit.

7. The display device according to claim 5, wherein bumps connected to the driver circuit are formed only in one side of the display cell.

8. A display device, comprising:
    a display cell including a display region and a frame region surrounding the display region;
    a metal frame to hold the display cell;
    a circuit board fixed to the metal frame along a longitudinal side of the display cell and arranged along a longitudinal side of the display cell;
    a driver circuit connected to the display cell to drive the display cell;
    electronic components provided at the circuit board to control the driver circuit;
    an insulating protection sheet to cover the driver circuit and the circuit board; and
    a conductive fixing tape to fix one end of the insulating protection sheet to the frame region of the display cell, the conductive fixing tape extending in a longitudinal direction beyond opposed ends of the display cell and folded to make electrical connection with the metal frame arranged in a rear side of the display cell, such that static charges generated in the display cell are discharged to the metal frame through the conductive fixing tape.

9. The display device according to claim 8, wherein the display device further comprises:
    a back light unit held by the frame, said circuit board arranged along a longitudinal side of the back light unit.

10. A liquid crystal display device, comprising:
    a display cell including a display region and a frame region surrounding the display region, the display cell including a pair of insulating substrates and a liquid crystal layer held therebetween;
    a metal frame including a fixing element to contain the display cell;
    a circuit board arranged along a longitudinal side of the display cell and fixed to the fixing element, the circuit board including fixing regions provided at ends of the circuit board to fix the circuit board to the fixing element;
    a flexible printed circuit film to connect the circuit board to the display cell;
    a driver circuit formed on the flexible printed circuit board and connected to the display cell to drive the display cell;
    electronic components provided at the circuit board to control the driver circuit;
    an insulating protection sheet to cover the driver circuit and the circuit board;

an insulating fixing tape to fix one end of the insulating protection film to the frame region of the display cell, the insulating fixing tape extending in a longitudinal direction of the display cell; and a conductive layer formed on the insulating fixing tape and extending in the longitudinal direction of the display cell, said conductive layer having an edge adjacent the metal fixing element so that static charges generated in the display cell are discharged to the metal fixing element through the conductive layer.

11. The liquid crystal display device according to claim 10, wherein the flexible printed circuit board is electrically connected to bumps provided at the frame region of the display cell.

12. A liquid crystal display device, comprising:
a display cell including a display region and a frame region surrounding the display region, the display cell including a pair of insulating substrates and a liquid crystal layer held therebetween;
a metal frame including a fixing element to hold the display cell;
a circuit board arranged along a longitudinal side of the display cell and fixed to the fixing element and including fixing regions provided at both ends of the circuit board to fix the circuit board to the fixing element;
a flexible printed circuit film to connect the circuit board to the display cell;
a driver circuit formed on one of the substrates and connected to the display cell to drive the display cell;
electronic components provided at the circuit board to control the driver circuit;
an insulating protection sheet to cover the driver circuit and the circuit board;
an insulating fixing tape to fix one end of the insulating protection film to a frame region of the display cell, the insulating fixing tape extending in a longitudinal direction of the display cell; and
a conductive layer formed on the insulating fixing tape and extending in the longitudinal direction of the display cell, said conductive layer having an edge adjacent the metal fixing element such that static charges generated in the display cell are discharged to the metal fixing element through the conductive layer.

13. The liquid crystal display device according to claim 12, wherein bumps connected to the flexible printed circuit board are formed only in one side of the display cell.

14. A liquid crystal display device, comprising:
an array substrate;
a counter substrate opposite the array substrate;
a liquid crystal layer held therebetween;
a seal element to attach the counter substrate and the array substrate at a peripheral region thereof;
a display cell including a display region and a frame region surrounding the display region, the display cell formed of the array substrate, the counter substrate and the liquid crystal layer;
a metal frame to hold the display cell;
a back light unit held by the metal frame to illuminate the display cell;
a circuit board fixed to the metal frame by a fixing element provided at the metal frame, the circuit board including fixing regions provided at both ends of the circuit board to fix the circuit board to the fixing element, and the circuit board being arranged along a longitudinal side of the back light unit;
a flexible printed circuit board to connect the circuit board to the display cell;
a driver circuit mounted on the flexible printed circuit board and connected to the display cell to drive the display cell;
electronic components provided at the circuit board to control the driver circuit;
an insulating protection sheet to cover the driver circuit and the circuit board; an insulating fixing tape to fix one end of the insulating protection sheet to the frame region of the display cell, the insulating fixing tape extending in a longitudinal direction of the display cell;
bumps connected to the flexible printed circuit board, the bumps formed only in one side of the display cell; and
a conductive layer formed on the insulating fixing tape and extending in the longitudinal direction of the display cell, said conductive layer having an edge adjacent the metal fixing element such that static charges generated in the display cell are discharged to the metal fixing element through the conductive layer.

* * * * *